United States Patent
Staiger

(10) Patent No.: US 6,628,441 B1
(45) Date of Patent: Sep. 30, 2003

(54) OPTICAL BUS SYSTEM AND METHOD

(75) Inventor: Dieter E. Staiger, Well im Schönbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/380,648

(22) PCT Filed: Oct. 24, 1997

(86) PCT No.: PCT/EP97/05876

§ 371 (c)(1),
(2), (4) Date: Sep. 7, 1999

(87) PCT Pub. No.: WO98/39861

PCT Pub. Date: Sep. 11, 1998

(30) Foreign Application Priority Data

Mar. 6, 1997 (DE) .......................................... 197 09 174

(51) Int. Cl.[7] .............................................. H04B 10/00
(52) U.S. Cl. ........................................ 359/163; 359/159
(58) Field of Search .................................. 359/159, 163

(56) References Cited

U.S. PATENT DOCUMENTS

| | | |
|---|---|---|
| 4,826,274 A | 5/1989 | Diamantstein et al. |
| 5,113,403 A | 5/1992 | Block et al. |
| 5,204,866 A | 4/1993 | Block et al. |
| 5,221,308 A | 6/1993 | Krohn et al. ................ 385/125 |
| 5,923,451 A * | 7/1999 | Karstensen et al. ......... 359/163 |
| 5,995,262 A * | 11/1999 | Hirota et al. ............... 359/163 |

FOREIGN PATENT DOCUMENTS

| | | |
|---|---|---|
| DE | 39 08 786 | 8/1989 |
| GB | 2 199 210 A | 6/1988 |
| GB | 2 201 561 | 9/1988 |
| GB | 2 300 775 | 11/1996 |
| WO | WO 85/03179 | 7/1985 |

OTHER PUBLICATIONS

German Office Action dated Jun. 14, 2002.
Natarajan et al., "Bi–Directional Optical Backplane Bus for General Purpose Multi–Processor Board–to–Board Optoelectronic Interconnects", Journal of Lightwave Technology, Bd. 13, No. 6, Jun. 13, 1995.
International Search Report Dated Mar. 6, 1997.

* cited by examiner

Primary Examiner—Daniel J. Wu
(74) Attorney, Agent, or Firm—Kevin Jordan, Esq.; McGinn & Gibb, PLLC

(57) ABSTRACT

The invention relates to a bi-directional optical data transfer system. The data is transferred by a diffuse light between several electronic components with several transmission links, wherein each transmission link is provided with a covering to prevent the transmission links from interfering with each other.

30 Claims, 4 Drawing Sheets

OPTICAL BUS SYSTEM AND METHOD

BACKGROUND OF THE INVENTION

1. Field of the Invention

The present invention relates to a system for the bidirectional optical transmission of information. In particular, it relates to the connection of electronic components via a bidirectional optical bus system.

2. Description of the Related Art

Electronic systems are normally composed of a series of fixed and/or variable electronic components (subsystems), which are connected to one another by a bus, which transports signals from one component to another.

Thus digital computer systems for example are designed in this way. A number of individual cards or electronic components form subsystems, which are integrated into a bus system, which transports signals for data, storage addresses, interrupts and the like. One of these cards may carry a processor for the execution of application programs, while others in turn may contain controllers for workstations or displays, adapters for mass storage units or interfaces for LANs (Local Area Networks) etc. However, the subsystems can also comprise navigation units, e.g. for use in cars, and video/audio or remote control units.

The functional electronic circuits on the individual cards or components have access to the common bus system for the transmission of data, addresses and control signals according to a certain bus protocol.

This type of packaging has important advantages. Thus a varying number of different types of subsystems can be configured in the system as a whole, for example. Adaptation of the system to the respective user environment is simple and can often be undertaken by the user without further assistance. New functions and improved technology can be integrated without difficulty at a later date without having to replace the entire system. Furthermore, diagnosis and repair of the system are improved by isolating individual subsystems.

Conventional hard-wired bus systems are relatively expensive and have disadvantages. In so far as electronics technology is experiencing increasing integration, connectors for transmitting signals from one unit to another are becoming ever more expensive or reliability can only be achieved at a very high cost. Added to this is an ever greater space requirement Some suggestions have been made for replacing parallel hard-wired ("copper") backplane bus systems for connecting individual subsystems of an electronic system, especially in the field of optical technologies. In spite of the necessity of converting electrical high-speed signals into optical signals and vice-versa, several optical backplane bus systems have been proposed. However, in this process optical signals are still only transmitted from one special point to another special point inside optical fibres. The biggest problem appears to lie in the fact that proposed optical bus systems, which could perhaps be used to connect a large number of electronic components, are very much more expensive and are only to be made as reliable as the hard-wired bus systems they are intended to replace at considerable expense. Exotic optical components, precise alignment within the components and the size of the optical units have caused the application of optical technologies to fail in electronic systems in which a large number of components have to communicate with one another via a common bus system.

It is also known to use light communications systems for serial and/or parallel communication, for example infrared systems in the case of light distribution in open spaces with air as the medium (remote controls) or laser light systems via optical fibres.

However, these systems have the disadvantage that either mutual interference restricts the application to so-called half-duplex operation, signals only being able to be transmitted simultaneously in one direction (IR remote control), or optical fibres or glass-fibre cables are used, which are susceptible to faults, can only be rendered operational using expensive plug-in systems and with regard to which problems occur in the transition of light between the cable and the plug-in connection (plug), for example due to condensation (laser light systems).

U.S. Pat. No. 5,113,403 and U.S. Pat. No. 5,209,866 disclose an electronic system consisting of a number of subsystems or electronic components, which are connected by an optical bus. The individual electronic components are arranged in a housing in such a manner that optical interface units disposed on each component form a monoaxial, bidirectional optical bus working in free space which distributes electrical signals among the individual components. These signals are transmitted along a single linear axis as polarized light beams. Here each individual component has a bus interface unit for generating outgoing light beams and receiving incoming beams along both directions of the axis respectively. The interface units use laser generators, photodetectors and amplitude-beam-splitters.

In spite of an improvement in the technique, however, these systems are still cost-intensive and only allow for compact construction to a very limited extent, since each individual component requires optical interface units.

Furthermore, these systems display lower reliability on account of the large number of optical elements used.

SUMMARY OF THE INVENTION

The object of the present invention is therefore to provide a system for the bidirectional optical transmission of information which utilizes,the advantages of optical technologies on the one hand and is economical on the other hand, displays a high degree of reliability in relation to faults and also permits compact construction of the individual electronic components.

This object is achieved according to the invention by a system for the bidirectional optical transmission of information with the aid of diffuse light between several electronic components with n transmission links.

In the system according to the invention, sheathing is provided for at least (n−1) transmission links in such a manner that mutual obstruction of the individual transmission links is prevented. In this regard a single transmission link can be formed as a so-called "open transmission link", i.e. this transmission link is not sheathed. Although the diffuse light conducted through this transmission link can then spread freely, the other transmission links are not influenced owing to their sheathing.

The system according to the invention offers the advantage that the advantages of an optical information transmission system, such as low susceptibility to faults, full-duplex operation and, in the case of a multi-channel execution, a real time application option can be utilized optimally by the use of economical receiver or transmitter devices. With the spread of diffuse light in free space, the problem normally exists that without the use of expensive modulation processes, light can only be transmitted in one direction simultaneously without mutual interference. This is acceptable for applications for which it is sufficient to transmit the information content only slowly. However, for certain requirements, for example an application in cars, this is not acceptable, as here a swift exchange of information with real-time characteristics is important. This disadvantage is remedied by the transmission system according to the invention.

Infrared light (IR light) can be used as diffuse light, for example, but any other diffuse light is also suitable.

The use of IR light as an example of diffuse light makes it possible to use. Standard IrDA (Infrared Data Association) elements, such as infrared receivers or transmitter units and to manage in this case without electrical connectors, optical coupler devices or complicated optical plug-in systems. Here no costly type of light modulation, such as phase shift keying, frequency or polarization modulation is necessary; the information is instead transmitted simply by the normal states "light on" and "light off" (on-off keying). Known procedures can be used as the transmission protocol.

A further advantage of using IR light consists in the fact that the system can operate as a genuine "real-time" system, i.e. only minimal conflict times occur (latency). Furthermore, a bus transfer is possible which permits simultaneous access by several users to the bus system (simultaneous multi user access).

Since when using infrared light no electrical fields of any kind are produced and the system is also insensitive to such fields, it is ideal for use in a sensitive environment. Furthermore, it is immune to shocks, vibrations and the respective surroundings. It thus has an extremely low susceptibility to faults in relation to condensation, dust, UV radiation etc.

The subsystems used can be any units communicating with one another, for example processors, and also devices such as mobile telephones, TVs, navigation units or graphics units, audio/video units and remote control systems.

BRIEF DESCRIPTION OF THE DRAWINGS

The system according to the invention is described in greater detail below with reference to the drawings.

DETAILED DESCRIPTION OF PREFERRED EMBODIMENT

In the present example, the diffuse light used for optical transmission of the information consists of IR light. However, any other diffuse light can be used, e.g. diffuse laser light, electroluminescence etc. The use of light in the infrared wavelength range (for example 870 nm) as the transmission medium has the advantage that relatively cheap standard components, which are common in the consumer goods industry, such as IR diodes and possibly even photoresistors, can be used as transmitting or receiving devices. A simple transmission protocol is also available in the IrDA physical layer protocol. When using other transmitting and receiving devices, any other transmission protocol can naturally be used. A further advantage of the use of IR light consists in the fact that the system offers the best conditions for the creation of a "real-time system" due to the light transmission links separated from one another. This includes inter alia the fact that information which has a high priority also receives preferential access to certain transmission links, while low-priority information is "diverted" to other transmission links. Furthermore, the transmission speed of light is very high and in the application example is only dependent in a negligible way (10 cm corresponding roughly to 333 ps) on the transmission length and loading of the bus system.

Figure 1:
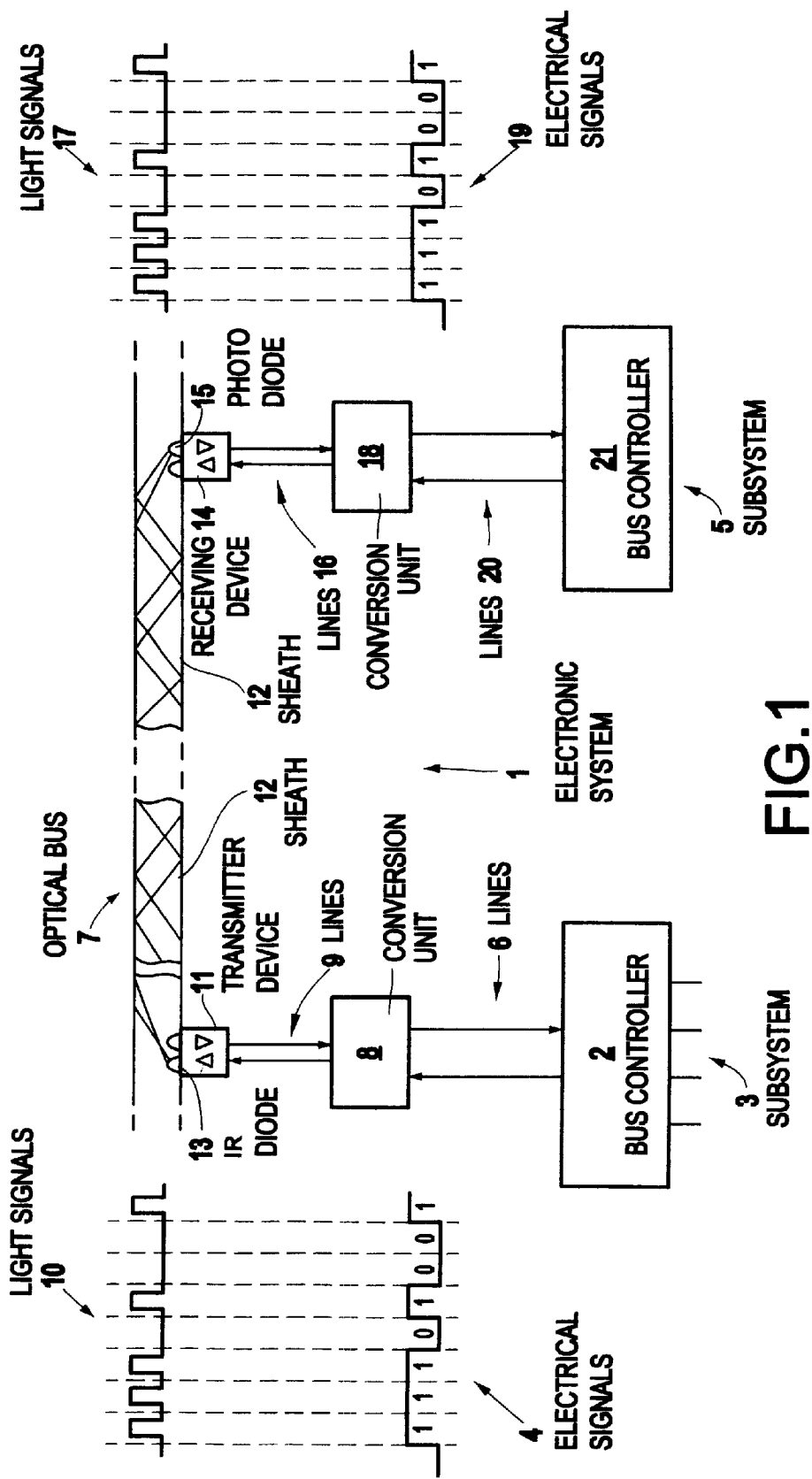
FIG. 1 shows a diagrammatic representation of the mode of operation of the transmission system according to the invention.

FIG. 1, represents diagrammatically the mode of operation of the transmission system according to the invention. An electronic system 1 communicates, for example, between its subsystems 3, 5 via an optical bus 7. The bus transmits the relevant information in this process along certain transmission links from one subsystem to the other. If subsystem 3, for example, wants to communicate information to subsystem 5, electrical signals 4 corresponding to the information to be transmitted are generated in an appropriate component of a processor unit (not shown). In the present example these signals consist of the sequence 11101001. These signals are subsequently routed via a bus controller, which takes over conversion to the respective protocol, and then routed via lines 6 to a conversion unit 8 such as a modulator/demodulator.

The signals are then routed via lines 9 in such a manner that the IR diode 13 is turned on and off accordingly as a transmitter device. Here "1" in the signal sequence selected means "light on" and "0" means "light off". The electrical signals are converted in this way into light signals 10 It should be pointed out that when using IrDA components, conversion has to take place to pulsating light owing to their AC coupling, i.e. in the event of a sequence of several "1" signals, the diode is turned on and off again each time. If other components are used, the pulsing can possibly be dispensed with. In the present example, an amplifier (not shown) amplifying the signals is also connected in series.

The pulsating light emitted by the IR diode 13 now radiates diffusely in all directions. As already indicated above, several transmission links may exist next to one another in the transmission system according to the invention. To avoid mutual influencing of the transmitting and receiving devices of these transmission links lying adjacent to one another, the radiated light is now routed, according to the invention along the transmission link provided (in the present example from subsystem 3 to subsystem 5) in a sheath 12. The transmitting and receiving devices project into the sheath. This sheath 12 thus forms a closed "channel" between the individual subsystems.

The diffuse light is now routed along the selected transmission link predetermined by the sheath 12 by reflection along the internal surface of the sheath 12 until it arrives at its destination, subsystem 5. There it meets the receiving device 14, which in the present example includes a photodiode 15 as a receiver However, other components are also conceivable correspondingly on the receiving side, such as photoresistors etc, as the expert can easily recognize.

The received light signals 17 are now converted by the receiving device 14 back into electrical signals 19 corresponding to the output signals 4 and routed through the lines 16 to a conversion unit 18 such as a modulator/demodulator. The signals are then transmitted through the lines 20 to the bus controller 21 of the receiving electronic components 5.

Figure 2:
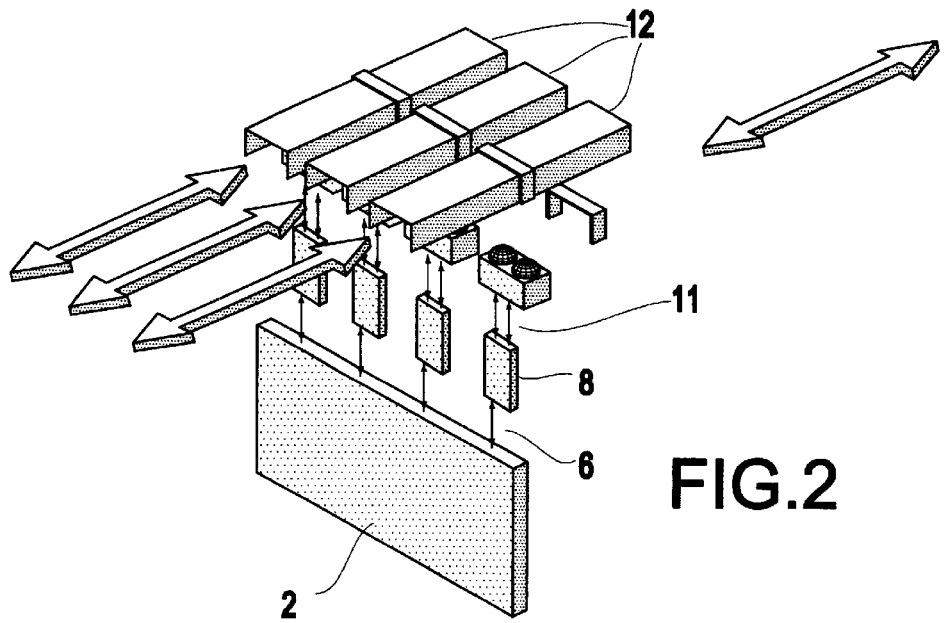
FIG. 2 shows-an enlarged representation of the transmission system according to the invention with several transmission links arranged adjacent to one another.

FIG. 2 shows an enlarged representation of the system with several sheathed transmission links 12 arranged adjacent to one another. Each individual transmission link 12 can be used for the transmission of independent information along the double arrow shown in each direction. Due to the sheath according to the invention, the transmission links do not exert any mutual influence on one another. In a special form of performance of the system according to the invention, eight transmission links are provided, so that a maximum of eight communication levels are present next to one another. However, any number of transmission links can be provided.

An "automatic gain control" devices (not shown) can be provided at the receiving devices, which control devices re-amplify signals which have become attenuated by absorption on their way along the transmission link, or attenuate accordingly signals which are too strong.

In a particularly advantageous configuration of the invention, the sheath is an integral part of the housing 22 (FIG. 3), into which the electronic components (subsystems) are embedded. In this way, the sheath can be manufactured in the same working step as the housing. No "backplane infrastructure" is required either, i.e. no subsystems have to be provided, as each further housing automatically extends the bus.

Figure 3:
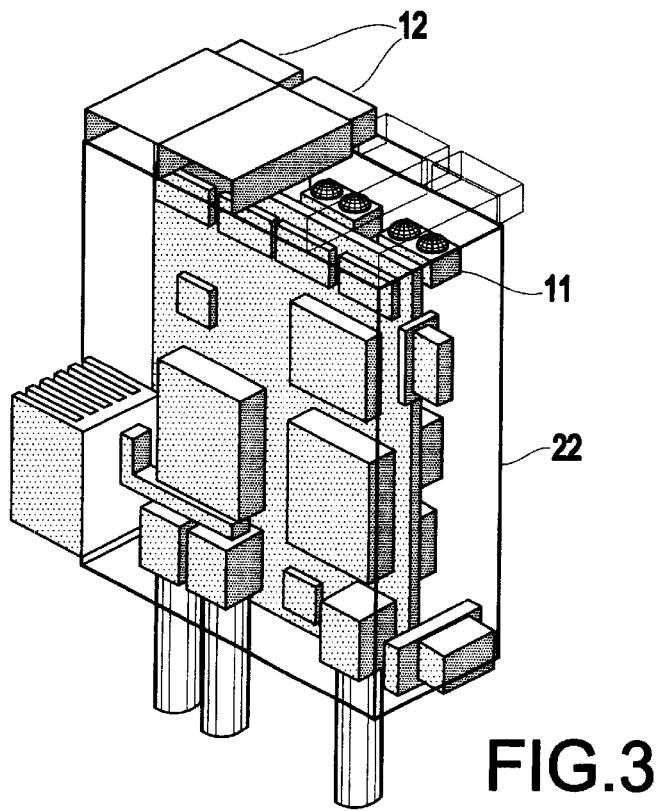
FIG. 3 shows a single electronic component as part of the transmission system according to the invention.

FIG. 3 shows a single component with the related transmitting and receiving devices and the corresponding sheaths.

The sheath preferably has a light-reflective inner surface, so that the diffusely radiated light can be routed along the sheath. The inner surface is preferably porous, so that the diffuse light can be reflected as randomly as possible in all directions.

In a particularly preferred form of performance, the sheath consists of magnesium, as magnesium has a very favourable ratio of weight to stability. However, it is also conceivable to use any other porous metal surface or synthetic material as the sheath material.

The sole factor of importance is the feasibility of being able to route diffuse light along the inner wall of the sheath.

Since the diffuse light spreads in all directions, the form of sheath is not restricted to straight channels. These channels can thus be routed in any form, for example bent or folded. However, it is advantageous to arrange various electronic components in a defined spatial arrangement one behind another, in order to avoid long paths and to save material.

Figure 4:
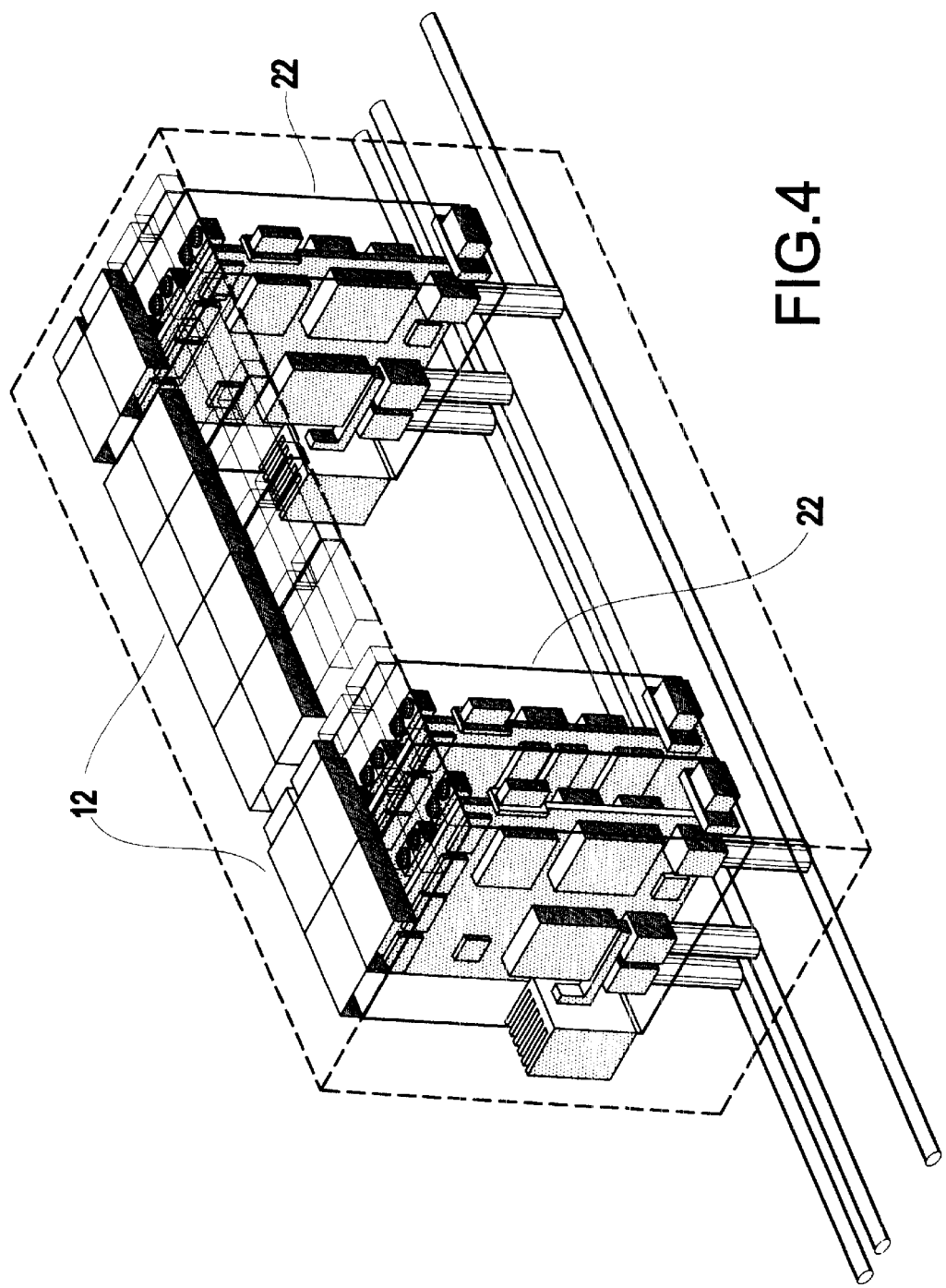
FIG. 4 shows several electronic components arranged one behind another within the transmission system according to the invention.

FIG. 4 shows a spatial arrangement of this kind of several subsystems one behind another. The individual components are each connected to one another via the sheathed channels 12. The advantages of an arrangement of this kind lie in the modular method of construction Only the number of components required is arranged together in each case. A stationary system of this kind is therefore arbitrarily expandable Even components which do not use the optical transmission system can be integrated into this arrangement. However, at least one channel must then be present, which guarantees that the other transmission links are not influenced. In addition, this channel need not necessarily have transmitting and/or receiving devices (transceivers).

Owing to the elimination of mutual interference of the transmission links, it is possible by means of the transmission system according to the invention to operate several communication levels adjacent to one another using diffuse light without interference. The option therefore exists of actual simultaneity of communication While fully utilizing the advantages of an optical system it is thus possible to achieve full duplex operation, which permits multi-channel communication simultaneously on several communication levels.

In a further preferred form of performance, all the existing transmission links are sheathed.

Figure 5:
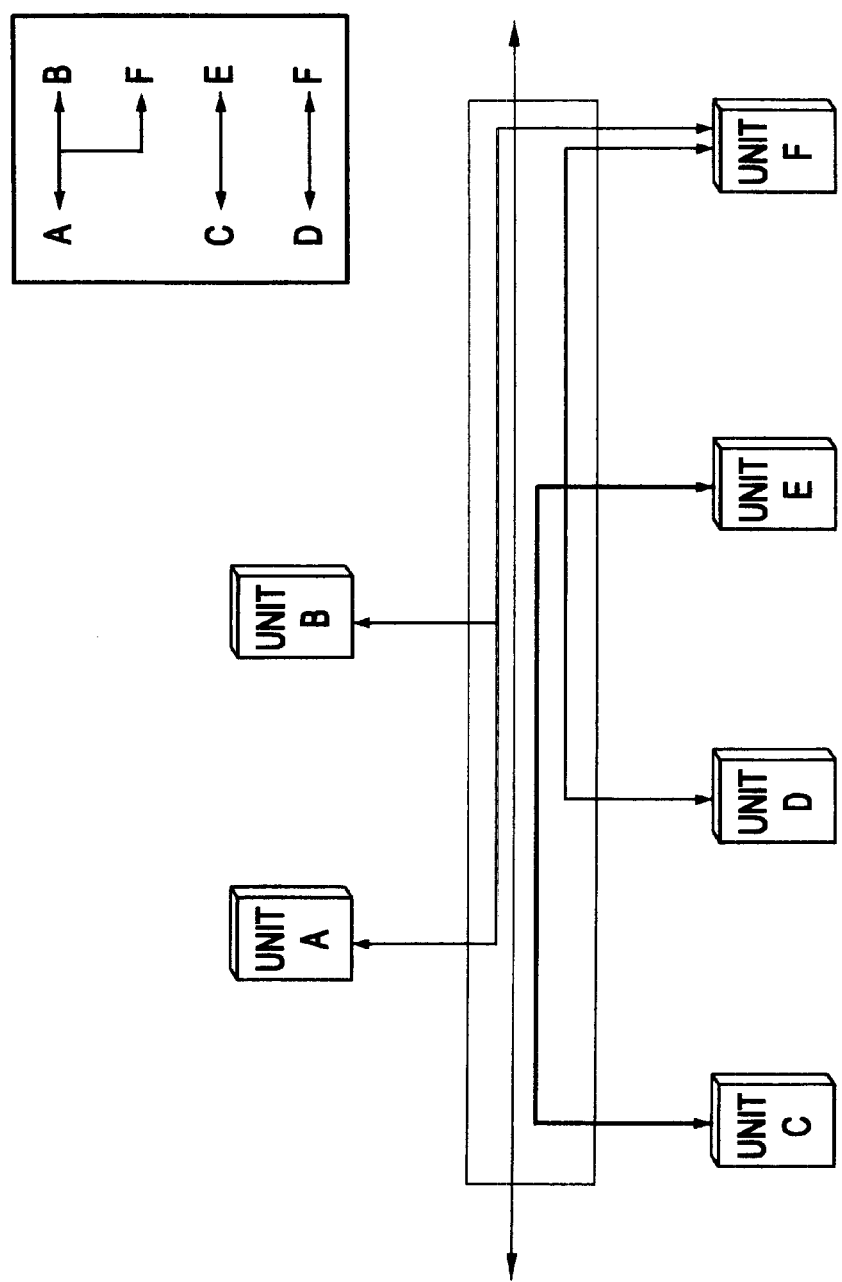
FIG. 5 shows a diagrammatic representation of the option of simultaneous access by several users to the transmission system according to the invention.

The consequence of this is that several users can access the same bus system at the same time "Multiple simultaneous access" of this kind is shown in FIG. 5.

Thus, the transmission system according to the invention permits simultaneous communication of subsystem A with the subsystems B and F, for example. It is possible for the subsystems C and E or D and F to communicate with one another at the same time as this communication. Information can be transmitted in parallel between the subsystems in this way without any obstruction of the individual transmission links occurring. Arrangements can also be provided at the individual subsystems that take over appropriate handling of the information for the respective subsystem.

What is claimed is:

1. System for bi-directional optical transmission of information between a plurality of electronic components within a housing by using a diffuse light, the system comprising n different transmission links between each two of the plurality of components, and a sheath that prevents mutual interference between the transmission links for at least (n−1) transmission links, the sheath being an integral part of the housing, wherein the n different transmission links are arranged adjacent to one another and the information is transmitted by on-off keying.

2. System in accordance with claim 1, wherein the diffuse light comprises IR light.

3. System in accordance with claim 1, wherein the transmission links comprise one of a transmitting device and a receiving device.

4. System in accordance with claim 3, wherein the transmitting device comprises an IR diode.

5. System in accordance with claim 1, wherein the sheath includes a light-reflective inner surface.

6. System in accordance with claim 5, wherein the inner surface is porous.

7. System in accordance with claim 1, wherein the sheath comprises magnesium.

8. System in accordance with claim 1, wherein the electronic components are in a defined spatial arrangement one behind another and each of the electronic components are connected together by the sheath.

9. System in accordance with claim 1, wherein eight transmission links are arranged one behind another.

10. System in accordance with claim 1, wherein all transmission links are sheathed.

11. System in accordance with claim 3, wherein the receiving device comprises an IR diode.

12. A method for bi-directional optical transmission of data between a plurality of electronic components having n transmission links within a housing by using diffuse light, the method comprising:

transmitting data using on-off keying, wherein individual ones of said plurality of electronic components are arranged one behind the other and connected by a sheathed channel that is an integral part of the housing.

13. System in accordance with claim 1, wherein the system is used in an optical bus system for electronic systems.

14. The method in accordance with claim 12, wherein the transmission of the data is for an optical bus system for electronic systems.

15. The method in accordance with claim 12, wherein each of said transmission links comprises a diode and said on-off keying comprises turning on said diode and turning off said diode.

16. The method in accordance with claim 12, wherein said sheathed channel forms a closed channel between said individual ones of said plurality of electronic components.

17. The method in accordance with claim 12, wherein said individual ones of said plurality of electronic components project into an interior of said sheathed channel.

18. A system for bi-directional transmission of information between a plurality of electronic components by using diffuse light, the system comprising:

a housing;

n different transmission links provided between two of the plurality of electronic components, the transmission links being arranged adjacent to one another; and a plurality of sheaths that prevent mutual interference between the transmission links, wherein the plurality of sheaths are an integral part of the housing.

19. The system of claim 18, wherein the electronic components are located within said housing.

20. The system of claim 18, wherein the information is transmitted by on-off keying.

21. The system of claim 18, wherein the transmission links comprise an IR diode.

22. The system of claim 18, wherein the diffuse light comprises IR light.

23. The system of claim 18, wherein each of the sheaths includes a light-reflective inner surface.

24. The system of claim 23, wherein the inner surface is porous.

25. The system of claim 18, wherein each of the sheaths comprises magnesium.

26. The system of claim 18, wherein the electronic components are in a defined spatial arrangement one behind another and each of the electronic components are connected together by the plurality of sheaths.

27. The system of claim 18, wherein eight transmission links are arranged one behind another.

28. The system of claim 18, wherein all transmission links are sheathed.

29. A system for bi-directional optical transmission of information between a first and second component by using a diffuse light, the system comprising:

a housing;

n different transmission links between said first and second component, and a sheath that prevents mutual interference between the transmission links, said sheath being an integral part of the housing.

30. A system as claimed in claim 29, wherein the n different transmission rinks are arranged adjacent to one another.

* * * * *